(12) United States Patent
Regensburger

(10) Patent No.: US 12,433,712 B2
(45) Date of Patent: Oct. 7, 2025

(54) LASER-BASED ALIGNMENT ASSISTANCE APPARATUS, LASER-BASED ALIGNMENT ASSISTANCE SYSTEM, AND AN X-RAY IMAGING SYSTEM

(71) Applicant: Siemens Healthineers AG, Forchheim (DE)

(72) Inventor: Alois Regensburger, Poxdorf (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 19/036,797

(22) Filed: Jan. 24, 2025

(65) Prior Publication Data
US 2025/0235285 A1    Jul. 24, 2025

(30) Foreign Application Priority Data
Jan. 24, 2024    (DE) ..................... 10 2024 200 638.6

(51) Int. Cl.
*A61B 90/13*    (2016.01)
*A61B 6/00*    (2024.01)

(52) U.S. Cl.
CPC ............ *A61B 90/13* (2016.02); *A61B 6/4441* (2013.01)

(58) Field of Classification Search
CPC ............................. A61B 90/13; A61B 6/4441
See application file for complete search history.

(56) References Cited

U.S. PATENT DOCUMENTS 5,782,842 A * 7/1998 Kloess ............... A61B 17/3403
606/130

FOREIGN PATENT DOCUMENTS

| CN | 109793559 A | 5/2019 | |
|---|---|---|---|
| DE | 19501069 A1 | 7/1996 | |
| DE | 102007029199 A1 * | 1/2009 | ........... A61B 6/4441 |

OTHER PUBLICATIONS

German Office Action for German App. No. 10 2024 200 638.6 mailed on Sep. 20, 2024, with English translation.

* cited by examiner

*Primary Examiner* — Mohamed G Gabr
*Assistant Examiner* — Khoa Tan Le
(74) *Attorney, Agent, or Firm* — Lempia Summerfield Katz LLC

(57) ABSTRACT

A laser-based alignment assistance apparatus used to assist with alignment of an instrument for puncturing a subject, which may be used for an X-ray imaging system, includes a first line laser to produce a first laser beam in a first laser plane. The first laser beam is configured to produce a first laser line on a first surface line in a first sectional plane when the first sectional plane corresponds to the first laser plane. The laser-based alignment assistance apparatus includes a second line laser to produce a second laser beam in a second laser plane, and a point-like shielding element to produce a shadow line in the second laser plane. The second line laser is configured to display a shadow point on a second surface line in a second sectional plane when the first sectional plane and the second sectional plane are aligned.

15 Claims, 9 Drawing Sheets

LASER-BASED ALIGNMENT ASSISTANCE APPARATUS, LASER-BASED ALIGNMENT ASSISTANCE SYSTEM, AND AN X-RAY IMAGING SYSTEM

This application claims the benefit of German Patent Application No. DE 10 2024 200 638.6, filed on Jan. 24, 2024, which is hereby incorporated by reference in its entirety.

BACKGROUND

The present embodiments relate to a laser-based alignment assistance apparatus used to align an instrument for puncturing a subject, a laser-based alignment assistance system, and an X-ray imaging system including the laser-based alignment assistance apparatus.

A laser-based alignment assistance apparatus may be used in medical applications in addition to other applications, such as, for example, in technical applications for processing material.

For example, it may be necessary for medical interventions to insert a medical instrument, such as a medical needle or cannula, into a subject in a targeted manner (e.g., through a subject surface along a planned and precisely defined puncture trajectory, such as percutaneously in a patient). Precise guidance and alignment of the instrument along the planned trajectory is especially important when performing a procedure inside the patient's body, such as on the spine or the internal organs, in particular, in order to provide the correct trajectory between tissue and bone and the targeted treatment of the respective organ, vessel, or bone.

Precise guidance and alignment of the instrument may be assisted and monitored using an X-ray imaging system, for example, but only to a limited extent as the X-ray imaging system is only able to provide a two-dimensional X-ray of the X-ray detector plane of the X-ray detector. For example, when the X-ray detector or the X-ray source is in a progress display position, in which the progress of the instrument within the subject may be displayed, a swivel movement of the instrument in or away from the detector plane cannot be displayed, which may thus lead to the hidden tilting of the instrument.

Line lasers of the laser-based alignment assistance apparatus, which may produce laser beams in intersecting laser planes, may be used to assist with aligning the instrument. Before the puncture, in a first position of the laser-based alignment assistance apparatus, for example, two intersecting laser lines may be displayed on the subject surface of the subject (e.g., on the patient's skin) in order to indicate the puncture entry point for the puncture. Additionally, the instrument may be aligned in the first position by moving the instrument around a first swivel axis and a second swivel axis, so that the intersecting laser beams are displayed on the instrument. For example, the instrument has a first sectional plane and a second sectional plane. The instrument is aligned according to the trajectory (e.g., is correctly positioned and correctly oriented for the puncture entry point if the first laser plane corresponds to the first sectional plane of the instrument, and the second laser plane corresponds to the second sectional plane of the instrument). For example, the line lasers may be adjusted for this purpose, so that, when an instrument is correctly aligned, the first sectional plane corresponds to the first laser plane and the second sectional plane to the second laser plane.

Accordingly, an adjusting device may be provided for the first line laser and for the second line laser, which may adjust based on a stipulated puncture trajectory (e.g., automatically).

However, the design may necessitate moving the apparatus away from the first position to a second position for or during the puncture of the subject, especially to enable the X-ray detector to be moved into the progress display position for the intervention.

The disadvantage of this is that, in the second position, the apparatus may only be used to a limited extent to align the instrument, as the design provides that the two laser planes no longer overlap with the two sectional planes of the instrument. For example, in the second position of the apparatus, the instrument may only be aligned using the laser lines with respect to the first sectional plane. Conversely, the second laser plane, which is turned relative to the second sectional plane, for example, does not provide any assisting information in the prior art for alignment of the second sectional plane. Nor may the second sectional plane of the instrument be aligned using the X-ray image, which provides there is a risk of hidden tilting of the instrument perpendicular to the detector plane during the intervention.

This problem has previously been resolved by temporarily returning the apparatus to the second position from the first position at regular intervals during the intervention, so that both sectional planes of the instrument may be realigned correctly. However, this has the disadvantage of interrupting and delaying the intervention and increasing radiation exposure. Alternatively, a mechanical alignment assistance apparatus may be provided, but the handling of this could be improved.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved concept for a laser-based alignment assistance apparatus, a laser-based alignment assistance system, and an X-ray imaging system are provided, so that an instrument user is assisted with aligning both a first sectional plane of the instrument and a second sectional plane of the instrument according to a puncture trajectory during a puncture, such as in a progress display position of the X-ray detector or a second position of the alignment assistance apparatus.

A first aspect of the present embodiments relates to a laser-based alignment assistance apparatus used to assist with the alignment of an instrument for puncturing a subject, where the alignment assistance apparatus may be provided, for example, for an X-ray imaging system.

The alignment assistance apparatus has, for example, a first line laser to produce a first laser beam in a first laser plane. The first line laser is configured to produce a first laser line on a first surface line of the instrument in a first sectional plane of the instrument, if the first sectional plane corresponds to the first laser plane.

The alignment assistance apparatus also has a second line laser, for example, to produce a second laser beam in a second laser plane intersecting the first laser plane. The second line laser has, for example, a point-like shielding element, where a shadow line may be produced in the second laser plane using the shielding element. The second line laser is configured to display a shadow point of the shadow line on a second surface line of the instrument in a second sectional plane of the instrument, if the first sectional plane and the second sectional plane are aligned.

"Alignment" provides, for example, positioning the instrument in its stipulated position and moving and swiveling the instrument in its stipulated orientation, and thus, for example, transverse movement along the three spatial directions and rotation around the three spatial directions. For example, alignment also includes correct alignment (e.g., correct alignment of the instrument in terms of a stipulated or planned puncture trajectory).

"Assistance" provides, for example, that the apparatus does not affect the alignment itself, but rather, that a user or other technical device is assisted with aligning the instrument correctly.

The present embodiments may guarantee that an instrument user may be assisted with correctly aligning both the first sectional plane of the instrument and the second sectional plane of the instrument according to a stipulated puncture trajectory during a puncture (e.g., in a progress display position of the X-ray detector or a second position of the alignment assistance apparatus). For example, the user may visually perceive if the instrument is correctly aligned. The instrument is calculated correctly, for example, if the first laser line is produced on the first surface line, and the shadow point is displayed on the second surface line. The user may monitor this visually to provide that the instrument is aligned according to the planned puncture trajectory.

For example, the user cannot visually detect any deviation from the correct alignment of the instrument (e.g., if the first laser line is not on the first surface line and/or if the shadow point is not on the second surface line). For example, the user may see a second laser line on the second surface line that intersects the second surface line at one point if the instrument is not aligned correctly. In this instance, the apparatus may assist the user with aligning the instrument correctly.

The user may proceed as follows for correct alignment. First, the user positions the instrument at a stipulated puncture entry point with a needle tip of the instrument, for example. The user then swivels the instrument around a first swivel axis until the first laser line is visible on the instrument, where the swivel axis may run through the puncture entry point. The user may then swivel the instrument around the first swivel axis and rotate the instrument around a rotation axis through the puncture entry point such that the first laser line is produced on the first surface line. The user may then swivel the instrument around a second swivel axis essentially running perpendicular to the first swivel axis, until the shadow point is displayed on the second surface line.

When an instrument has rotational symmetry, such as a medical needle, for example, the step of rotating around the rotation axis is not required. In the case of such an instrument in particular, a first line along the needle may represent the first surface line, while a second line along the needle, offset from the first line, may represent the second surface line.

When inserting the instrument along the stipulated puncture trajectory, it may be provided, for example, that the first laser line is still produced on the first subject line and that the shadow point migrates to the second surface line.

A major advantage of the apparatus according to the present embodiments arises, for example, in that a user or an electromechanical device may be assisted with aligning both the first sectional plane and the second sectional plane of the instrument according to a stipulated alignment position or a puncture trajectory. Such assistance may even be guaranteed if the second line laser cannot emit the second laser beam in the laser plane that would correspond to the second sectional plane of the aligned instrument, for example, because of its unavoidable positioning for a puncture. This may be the case, for example, if the line laser is arranged on the housing of the X-ray detector or the X-ray source of the X-ray imaging system. Then, it may be provided that in a first position of the apparatus, or in a top view position of the X-ray imaging system, the line laser may be arranged such that the line laser may produce a laser cross on the subject surface and a laser cross on the instrument; however, the progress of the instrument being inserted into the body cannot be monitored in this position.

In order to monitor the progress of the instrument, it may be provided that the X-ray imaging system is to be moved into a progress display position, which provides that the apparatus is to be moved into a second position as well. In the second position, it may be the case accordingly that the instrument may only be aligned with respect to the first sectional plane using the first line laser, whereas without producing the shadow line, the second line laser may no longer provide any assisting information to align the instrument with respect to the second sectional plane.

For example, the instrument may even be aligned in the second position of the apparatus with respect to the second sectional plane using the point-like shielding element according to the present embodiments, which makes instrument handling much easier and allows for a much more targeted puncture.

Another advantage arises in that existing apparatuses without such a shielding element according to the present embodiments may be retrofitted with a shielding element extremely easily and cost-effectively by a minimal change, generating high added value. In one embodiment, the shielding element does not restrict any other functionality of the apparatus (e.g., in the top view position), which provides that the shielding element results in no negative side effects.

It may be provided that the instrument has to be aligned manually by a user, especially by hand, or by an alignment or guidance apparatus for the instrument. The user is assisted with aligning the instrument by the laser-based apparatus.

For example, the instrument is to be aligned according to a puncture trajectory planned before the puncture, along which the instrument is guided through the subject surface into the subject.

"Puncture" provides, for example, the insertion of a pointed instrument or a pointed part of an instrument through the subject surface into the subject. The puncture does not have to be restricted in this context to a medical puncture, but may also occur in the mechanical processing of objects.

In the case of medical puncture, it may be provided that a medical needle, a cannula, a trocar, or similar is inserted into a human or animal body, especially percutaneously, in order, for example, to inject fluids in a targeted manner or to remove bodily fluids.

Accordingly, the instrument may be a medical instrument such as a medical needle, a cannula, a trocar, a drill, or similar, and the subject surface may be the skin and the subject may be a body. In the broadest sense, the instrument may be a technical instrument such as a drill, a screwdriver, a chisel, or similar, which is suitable for a puncture.

The instrument may have, for example, three virtual sectional planes, comparable to the main planes of a human body. The three sectional planes may, for example, be positioned orthogonally to each other and intersect, for example, at a common point of intersection (e.g., in the center of the instrument). The first sectional plane and the second sectional plane may, for example, run in a direction of the longitudinal axis of the instrument, along the needle, for example. For example, the first sectional plane and the second sectional plane may intersect on the longitudinal axis. The longitudinal axis may run, for example, through the middle of the needle of the instrument.

The first surface line and/or the second surface line may, for example, be visible on the instrument, for example, in the form of a notch line or color-coded line. Likewise, the first surface line and/or the second surface line may already be stipulated by the instrument, for example, if the instrument is a medical needle or handle.

The apparatus may also be used, for example, to assist with a medical intervention (e.g., a percutaneous vertebroplasty) using an X-ray imaging system for assistance.

"Line laser" may be a laser with a special optic that may be used to produce a laser line on a surface rather than a laser point as produced by a laser pointer. For this purpose, the line laser may emit fan-like laser radiation in a laser plane, which produces the line on contact with a surface. "Laser plane" may be, for example, the plane that is spanned by the vectors of the laser beams of the laser radiation.

For example, the two laser planes intersect on a laser intersection line. For example, it may be provided at least approximately that the laser intersection line intersects the intersection line of the first sectional plane and the second sectional plane of the aligned instrument.

For example, the line lasers are configured to emit a continuous laser beam. For example, the laser beam is also thus emitted if the instrument has not yet been aligned or has only been partially aligned. For example, the first laser line may be displayed at an angle or apart from the first surface line if the instrument has not been correctly aligned with respect to the first sectional plane, or the shadow point may be displayed apart from the second surface line if the instrument has not been correctly aligned with respect to the second sectional plane.

The line lasers may be adjusted and/or calibrated accordingly for an individual puncture, so that the line lasers may be used to assist with correct alignment of the instrument along the puncture trajectory.

The apparatus may, for example, be configured in the first position to display a puncture point on the subject surface using a laser line cross and to align the instrument including without the shielding element with respect to the first sectional plane and the second sectional plane.

In the second position of the apparatus, the second laser plane of the second line laser may no longer be adjusted in the second sectional plane of the aligned instrument because of its position. Rather, it may be stipulated that the second laser plane may sit transverse to the aligned second sectional plane (e.g., at a right angle to each other or at an angle of 30 degrees to 150 degrees to each other).

The shielding element may be arranged directly at an exit point or in an exit area of the second line laser. "Point-like" may be, for example, that the shielding element may represent a point in the second laser plane, or that the shielding element intersects the second laser plane at a point.

For example, the shielding element is configured to shield the second laser beam at a point. This results in the point producing a shadow line in the second laser plane, which extends in a linear manner within the second laser plane. For technical or optical reasons, it may be stipulated that the shadow line fans out slightly as it progresses.

"Shadow point" may be, for example, a shielded point or shielded area of the second laser line. For example, by swiveling the instrument around the second swivel axis, the second laser line may thus be made visible on the instrument and the shadow point as a shielded area between two partial lines of the second laser line.

For example, it may be provided that the shadow line of the second laser plane intersects the first laser line at an intersection point. This intersection point may correspond at least approximately to a point on the intersection line of the first sectional plane and the second sectional plane.

At least one embodiment variant provides for the shielding element to be an adjustable shielding element. Accordingly, an adjusting device may be provided for the shielding element, which may adjust based on the stipulated or planned puncture trajectory (e.g., automatically). The shielding element may be adjusted for each individual puncture intervention, especially in terms of setting and calibration. For example, a geometric position of the physical shielding element may be altered by the adjusting apparatus.

The shielding element may also correspond to a tinting of photochromic glass or darkening of electrochromic glass, which is penetrated by the second laser beam. For example, the shielding element may be adjusted by applying an electric voltage to the electrochromic glass. The shielding element may also be technically realized using a liquid crystal element.

At least one embodiment variant provides for the second line laser to have an imaging optic that is configured to sharpen a contour of the shadow point. A sharpened shadow point may allow the instrument to be correctly aligned with greater precision around the second swivel axis. For example, the imaging optic may sharpen the ends of the partial lines of the second laser line that delineate the shadow point. The imaging optic may be configured to bring the ends of the partial lines as close together as possible, while remaining visually distinct, so that the shadow point is as small as possible.

The imaging optic may, for example, have various lenses and screens that may be adjusted and, for example, focused.

At least one embodiment variant provides for the shielding element to be a filament that intersects the second laser plane at a point. Using a filament, the shielding element may be realized particularly easily and cost-effectively or retrofitted on existing apparatuses without a shielding element.

"Filament" may, for example, be a thread, a fiber, a string, a fine wire, or similar. The filament may be linear. For example, the filament may essentially run orthogonally to the second laser plane, or at least at an intersection angle of 60 degrees to 120 degrees.

At least one embodiment variant provides for the laser-based alignment assistance apparatus to have a housing, on which the first line laser and second line laser are arranged separately to each other. Using the common housing, the position of the two line lasers may be precisely stipulated. A common laser coordination system may be used to adjust the line lasers thanks to the fixed position of the two line lasers with regard to each other. Additionally, the housing may be aligned spatially in a defined manner, so that the two line lasers may be aligned in a defined manner, making it easier to adjust or calibrate the two line lasers.

At least one embodiment variant provides for the housing to have a main extension area. The first line laser is positioned on a longitudinal side of the main extension area, and the second line laser is positioned on a transverse side of the main extension area. For example, the line lasers are positioned at an edge of the main extension area. As a result, the housing may be used for other purposes (e.g., for the arrangement of an X-ray detector or an X-ray source). The main extension area may correspond to the detector area.

At least one embodiment variant provides for the first line laser being configured to produce the first laser beam in the first laser plane, which essentially extends perpendicular to the main extension area, and for the second line laser being configured to produce the second laser beam in the second laser plane, which essentially extends perpendicular to the main extension area and perpendicular to the first laser plane. For example, the laser planes may be parallel in each case to an orthogonal of the main extension area and, for example, parallel to a central projection beam of the X-ray detector. Thus, laser planes positioned in this manner may be used to assist with aligning the instrument.

At least one embodiment variant provides for the laser-based alignment assistance apparatus to have a positioning device, on which the housing is arranged. For example, the housing may be connected to the rotation apparatus in a fixed manner or can be self-rotating. The positioning device may be used, for example, to position the housing. The positioning device may be mounted in such a way that the housing may be positioned along a path (e.g., along a circular path).

The rotation apparatus may be configured to position the housing at least in a first position and in a second position (e.g., along a circular path around the subject). The first position and the second position may, for example, be offset from each other on the circular path essentially by a circle angle of 90 degrees, or in a range from 60 degrees to 120 degrees.

In the first position, the first line laser and the second line laser may be configured so that the first laser line intersects the second laser line at a puncture entry point on the subject surface. As a result, the apparatus may assist the user with positioning the instrument at the puncture entry point. The instrument may also be oriented correctly using the intersected lines.

The first position may be unsuitable for the puncture intervention, however, in particular, because in this position, the X-ray imaging system cannot be positioned in a progress display position to track the progress of the instrument within the subject.

In the second position, in which the X-ray imaging system may be in the progress display position, the first line laser is configured to produce the first laser line on the instrument positioned at the puncture entry point on the first surface line, if the first sectional plane corresponds to the first laser plane. Likewise in the second position, the second line laser is configured to display the shadow point on the second surface line of the instrument positioned at the puncture entry point, if the first sectional plane and the second sectional plane are aligned.

This provides that the apparatus is able to assist the user in at least two positions with aligning the instrument correctly according to the stipulated puncture trajectory.

A further aspect of the present embodiments relates to a laser-based alignment assistance system used to assist with the alignment of an instrument for puncturing a subject.

The laser-based alignment assistance system includes the laser-based alignment assistance apparatus according to the present embodiments and the instrument, which has marking along the second surface line. The second sectional plane is aligned if the shadow point is displayed on the marked second line.

In other words, marking is provided on the instrument that enables the user to identify the second surface line. In the case of complex instruments, for example, with which the surface lines are not produced using the geometry of the instrument, this marking or the marked second surface line may assist the user with displaying the shadow point on the second surface line by swiveling the instrument, so that the instrument is correctly aligned.

In one embodiment, the marking may be on the second surface line, especially in the case of narrow instruments.

The marking may, for example, be color coding and/or notching or a protruding bar on the surface of the instrument.

For example, the first surface line may also be marked, provided that the first surface line is not already indicated by the geometry of the instrument.

The system according to the present embodiments may guarantee that an instrument user may be assisted with correctly aligning both the first sectional plane of the instrument and the second sectional plane of the instrument according to a stipulated puncture trajectory during a puncture (e.g. in a progress display position of the X-ray detector or a second position of the alignment assistance apparatus). For example, the user may visually perceive if the instrument is correctly aligned, which is additionally provided by the marking. The instrument is calculated correctly, for example, if the first laser line is produced on the first surface line and the shadow point is displayed on the marked second surface line. The user may monitor this visually to provide that the instrument is aligned according to the planned puncture trajectory.

At least one embodiment variant of the alignment assistance system provides for the instrument to have a handle that has the marking for the second surface line. The handle may, for example, be suitable for applying the marking, as this may have a certain size. A needle for the puncture may be arranged on the handle, for example. The user may hold the handle, for example, and thus may insert the needle into the subject.

At least one embodiment variant of the alignment assistance system provides for the marking to be offset from the second surface line depending on the thickness of the instrument. For example, the marking may run parallel to the second surface line. As a result, an angle of incidence of the second laser beam on the instrument may be taken into account.

A further aspect of the present embodiments relates to an X-ray imaging system, having at least an X-ray source and an X-ray detector, as well as the laser-based alignment assistance apparatus according to the present embodiments, or the laser-based alignment assistance system according to the present embodiments.

At least one embodiment variant of the X-ray imaging system provides for the first line laser and the second line laser to be arranged on a housing of the X-ray detector or on a housing of the X-ray source. For example, the positioning of the line lasers may thus be stipulated in relation to the X-ray detector or X-ray source. As a result, and, for example, due to the common housing of the line lasers with the detector or the X-ray source, it is extremely easy to couple an X-ray coordination system of the X-ray detector to a laser coordination system of the line lasers. This enables the line lasers to be adjusted easily depending on a planned trajectory within an X-ray image of the X-ray detector.

Due to the common housing, the first position of the alignment assistance apparatus, for example, is directly coupled to the top view position of the X-ray imaging system, and the second position of the alignment assistance apparatus is directly coupled to the progress display position of the X-ray imaging system.

At least one embodiment variant of the X-ray imaging system provides for the first line laser being configured to produce the first laser beam in the first laser plane, which essentially extends parallel to a projection direction of the X-ray imaging system, and the second line laser being configured to produce the second laser beam in the second laser plane, which essentially extends parallel to the projection direction and perpendicular to the first laser plane.

At least one embodiment variant of the X-ray imaging system provides for the X-ray imaging system to have a rotating C-arm as a positioning device. The C-arm is configured to move the X-ray source and the X-ray detector with respect to the subject at least in the top view position and in the progress display position.

In the top view position, the first line laser and the second line laser are configured such that the first laser line and the second laser line intersect at the puncture entry point on the subject surface. In the progress display position, the first line laser is configured to produce the first laser line on the first surface line on the instrument positioned at the puncture entry point, if the first sectional plane corresponds to the first laser plane, and the second line laser is configured to display the shadow point on the second surface line of the instrument positioned at the puncture entry point, if the first sectional plane and the second sectional plane are aligned.

Independent of the grammatical term usage, individuals with male, female, or other gender identities are included within the term.

DETAILED DESCRIPTION

Figure 1:
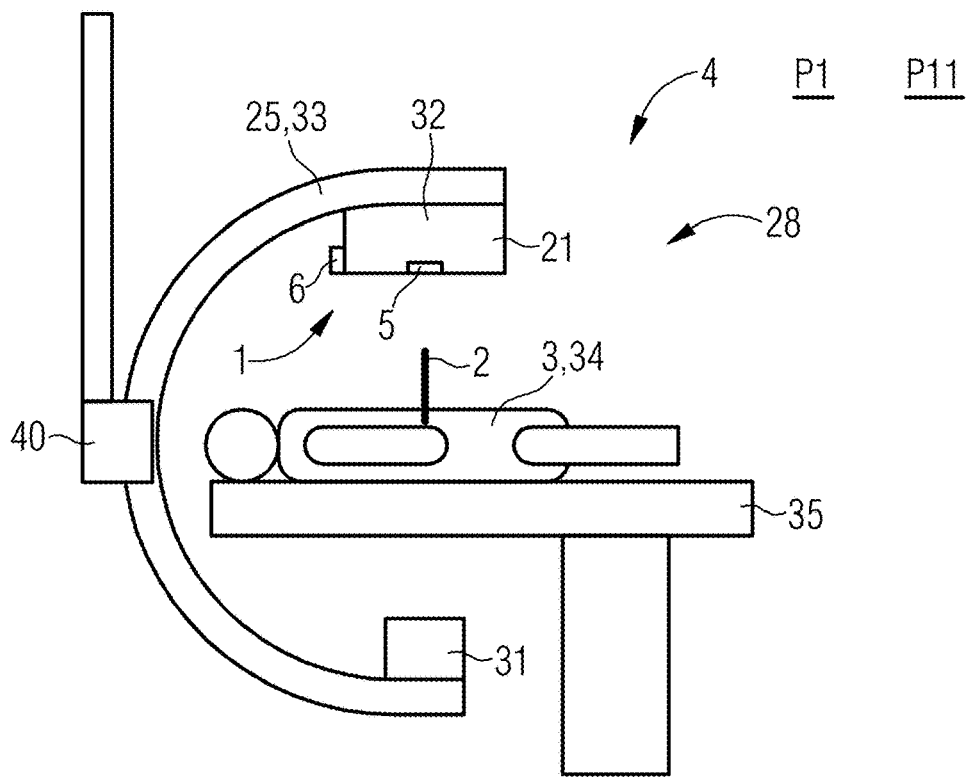
FIG. 1 is a schematic representation of an example embodiment of an X-ray imaging system in a top view position.

FIG. 1 shows a schematic representation of an example embodiment of an X-ray imaging system 4 according to the present embodiments in a top view position P11. In the example shown, the X-ray imaging system 4 has an X-ray source 31 and an X-ray detector 32 that may generate a detector image 36 of a subject 3 (e.g., a patient 34). The patient 34 may lie on a patient table 35 of the X-ray imaging system 4 for this purpose. For example, the X-ray imaging system 4 may provide imaging assistance for a puncture of the patient 34 for a percutaneous vertebroplasty, for example. An instrument 2 may include a medical instrument 2 (e.g., a medical needle). In the top view position P11, it is not possible to display the progress of the instrument 2 in the patient, however (e.g., not the insertion depth of the instrument 2 in the patient 34, cf. FIG. 2). In this respect, the X-ray imaging system 4 cannot be used advantageously during the medical intervention in the top view position P11.

Figure 4:
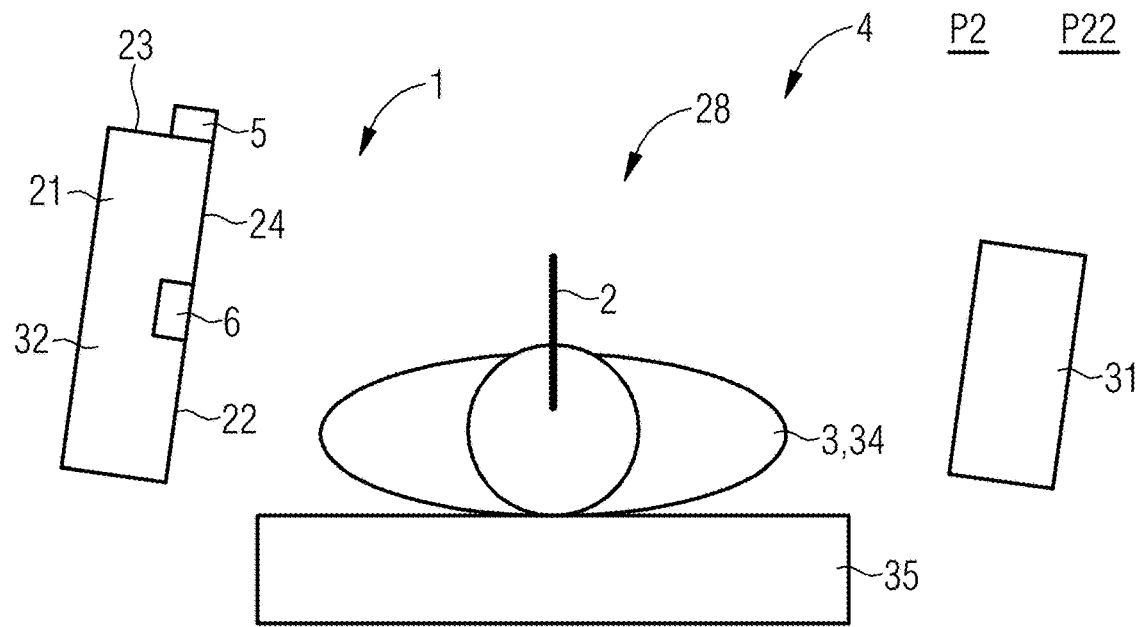
FIG. 4 is a schematic representation of an example embodiment of an X-ray imaging system in a progress display position.

The detector may, for example, be mounted on a positioning device configured as a rotating C-arm 33 that is configured to move the X-ray source 31 and the X-ray detector 32 with respect to the subject 3 from the top view position P11 to a progress display position P22 (e.g., cf. FIG. 4). The C-arm 33 may be mounted over a pivot bearing 40 for this purpose.

A housing 21 of the X-ray detector 32 may, for example serve as a common housing 21 for the X-ray detector 32 and a laser-based alignment assistance apparatus 1. The apparatus 1 may, for example, have a first line laser 5 and a second line laser 6 that may be arranged separately to each other on the housing 21.

In the top view position P11, the apparatus 1 may, for example, be aligned in a first position P1, as this may be coupled to the position of the X-ray imaging system 4 due to the common housing 21.

Figure 2:
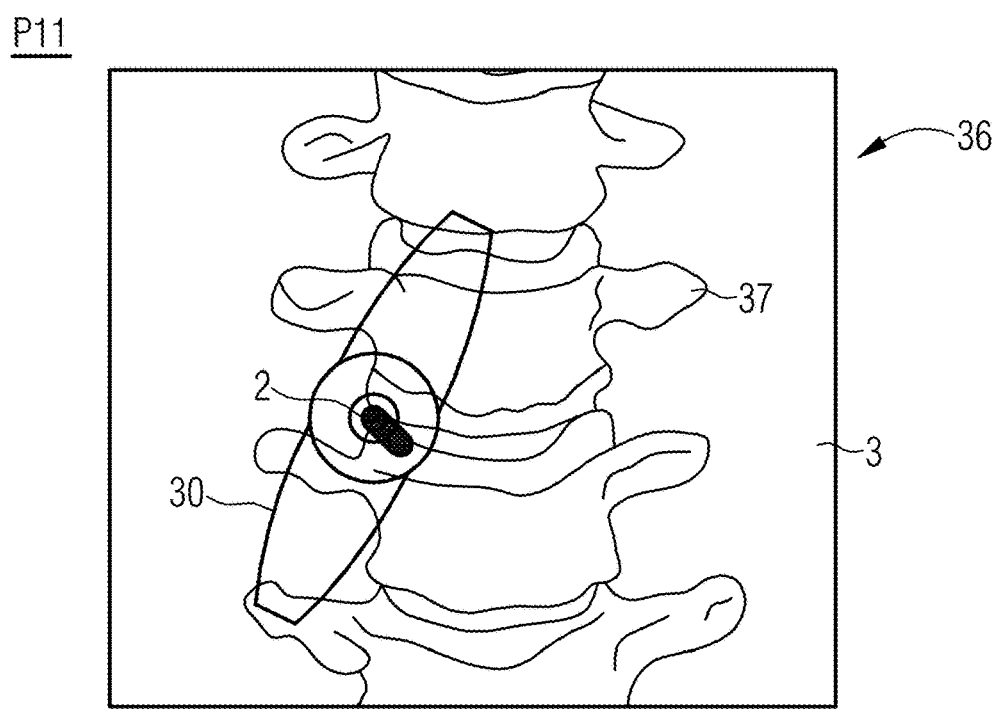
FIG. 2 is a schematic representation of a detector image from the top view position.

FIG. 2 shows a schematic representation of a detector image 36 of a subject 3 (e.g., the patient 34) from the top view position P11. For example, a vertebra 37 and the instrument 2, which may have a handle 30, may be seen here. The instrument 2 may be positioned in the detector plane from the top view position P11, but it is not then possible to determine the insertion depth of the instrument 2, which would be of interest for the intervention to the user (e.g., the attending physician).

Figure 3:
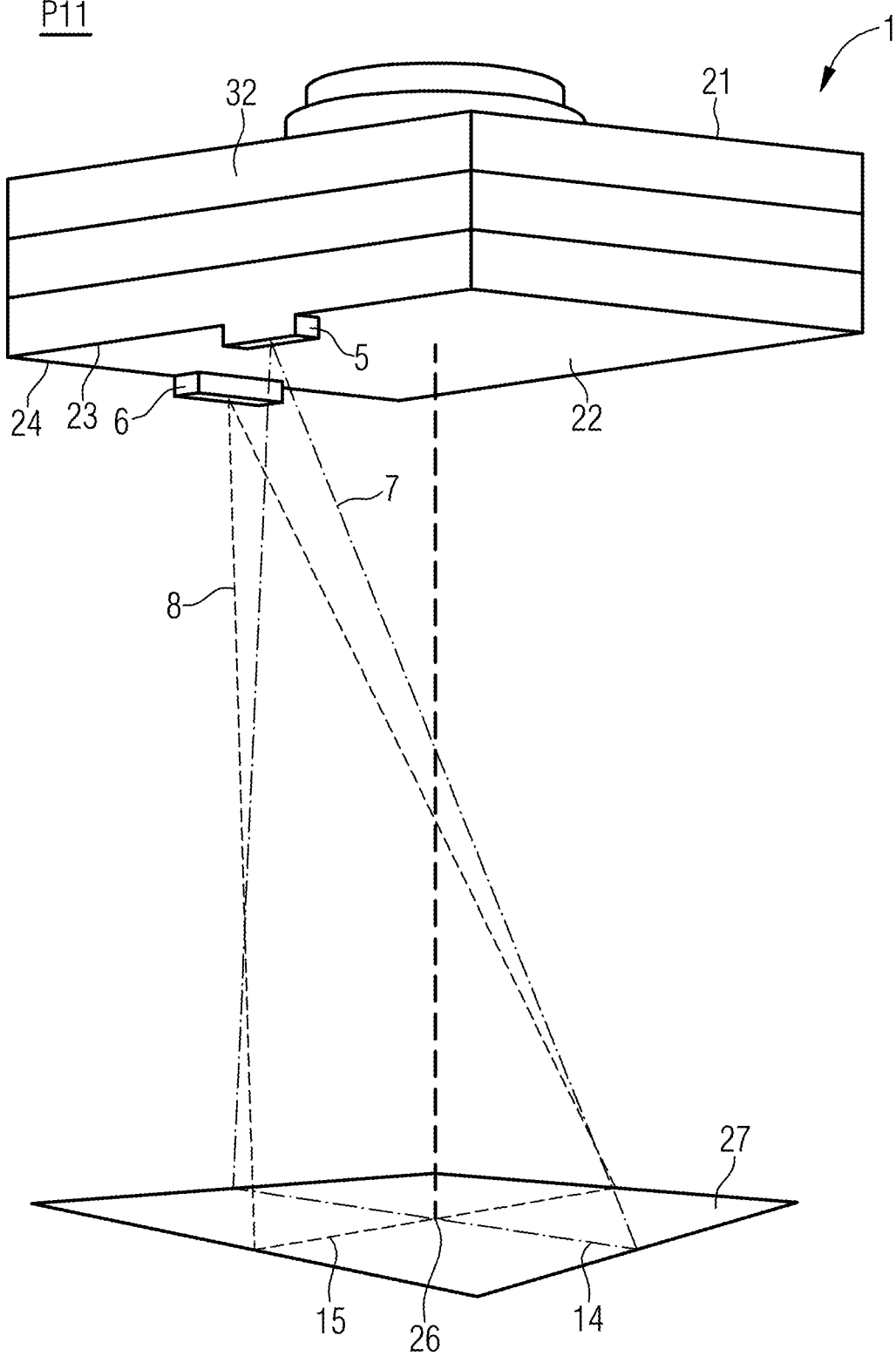
FIG. 3 is a schematic representation of an example embodiment of an X-ray detector with a laser-based alignment assistance apparatus according to the present embodiments in a first position.

FIG. 3 shows a schematic representation of an example embodiment of an X-ray detector 32 with a laser-based alignment assistance apparatus 1 according to the present embodiments used to assist with the alignment of an instrument 2 for a puncture in a first position P1. In this example, the first line laser 5 is provided on a longitudinal side 23 of the main extension area 22, and the second line laser 6 is provided on a transverse side of the main extension area 22, so that the first line laser 5 and the second line laser 6 are mounted outside the detector plane and do not interfere with the detector image.

The first line laser 5 may be configured to produce a first laser beam in a first laser plane 7 that may essentially cover a main extension area 22 of the housing 21. The main extension area 22 of the housing 21 may, for example, correspond to the detector plane of the X-ray detector 32. The second line laser 6 is configured to produce a second laser beam in a second laser plane 8 that essentially extends perpendicular to the main extension area 22 and perpendicular to the first laser plane 7. When the laser beams encounter a surface, for example, on a subject surface 27 of the subject 3, the first line laser 5 may produce a first laser line 14, and the second line laser 6 may produce a second laser line 15.

In the first position P1, the first line laser 5 and the second line laser 6 may be adjusted and configured accordingly, so that the first laser line 14 and the second laser line 15 intersect at a puncture entry point 26 on the subject surface 27.

FIG. 4 shows a schematic representation of an example embodiment of an X-ray imaging system 4 according to the present embodiments in a progress display position P22. For example, the X-ray source 31 and the X-ray detector 32, along with the apparatus 1, may be rotated using the C-arm 33 (not shown) from the top view position P11 by approximately 90 degrees to this progress display position P22.

This progress display position P22 may, for example, be advantageous for the user, as the progress display position P22 enables the user to detect the insertion depth of the instrument 2 in the patient 34 on the detector image 36 (cf., FIG. 5), so that the system 4 is primarily used in the progress display position P22 during the intervention.

In the progress display position P22, the laser-based alignment assistance apparatus 1, which is coupled to the position of the system 4, is in a second position P2 that may be offset relative to the first position P1 by approximately 90 degrees.

Figure 5:
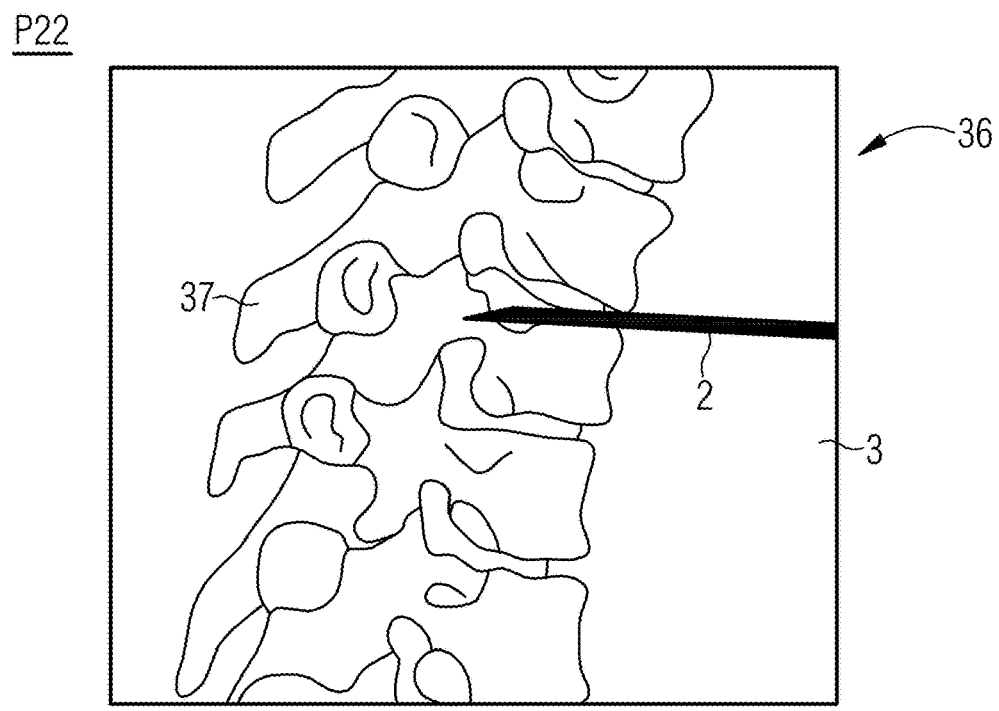
FIG. 5 is a schematic representation of a detector image from the progress display position.

FIG. 5 shows a schematic representation of a detector image 36 from the progress display position P22. In one embodiment, the attending physician may show the insertion depth of the instrument 2 (e.g., a medical needle) in the subject 3 (e.g., in the vertebra 37 of the patient). However, the disadvantage is that no tilting of the instrument 2 into the detector plane or out of the detector plane may be detected in this detector image 37. Nor is this possible in the prior art using an alignment assistance apparatus in the second position P2.

Figure 6:
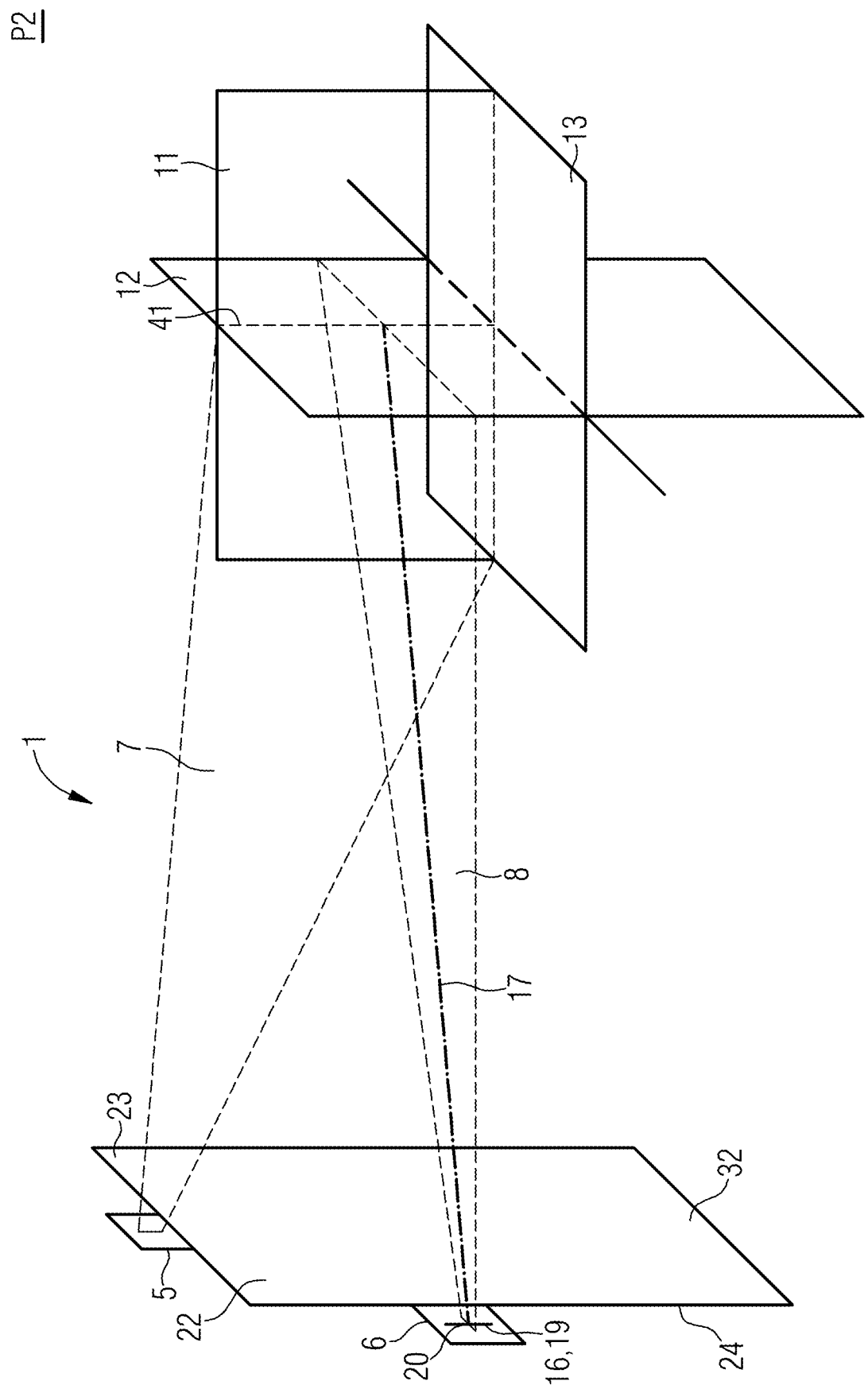
FIG. 6 is a schematic drawing of a laser-based alignment assistance apparatus according to the present embodiments in a second position.

FIG. 6 shows a schematic drawing of a laser-based alignment assistance apparatus 1 according to the present embodiments in the second position P2. It may be provided, for example, that the first line laser 5 is configured and adjusted so that this produces the first laser beam in the first laser plane 7, which corresponds to a virtual first sectional plane 11 of the instrument 2 (not shown) correctly aligned according to a planned puncture trajectory.

Based on the shown and described arrangement of the second line laser 6, it is not possible to adjust this in such a way that the second laser plane 8 corresponds to a second virtual sectional plane 12 of the instrument 2 correctly aligned according to the planned puncture trajectory. For example, the second laser plane 8 may be approximately at a right angle to the second sectional plane 12, so that the instrument 2 cannot be aligned with respect to the second sectional plane 12 without additional means.

A point-like shielding element 16 of the second line laser 6 may be provided to resolve this problem, which produces a shadow line 17 in the second laser plane 8. The second line laser 6 may now be configured and adjusted so that the shadow line 17 at least approximately intersects a virtual intersection line 41 of the first sectional plane 11 and the second sectional plane 12. "Approximately" in this context provides that the shadow line 17 may run slightly alongside the intersection line 41, depending on a thickness of the instrument 2, so that the instrument 2 may be correctly aligned.

The shielding element 16 may be an adjustable shielding element 16 that may be adjusted depending on the puncture trajectory and thickness of the instrument 2 (e.g., automatically using an adjusting device and corresponding software).

In the example, the shielding element 16 may be a filament 19 (e.g., a thin metal wire) that intersects the second laser plane 8 in a "point-like" manner at a point 20.

For example, the second line laser 6 may have an imaging optic (not shown) that is configured to sharpen a contour of the shadow point 17.

Figure 7:
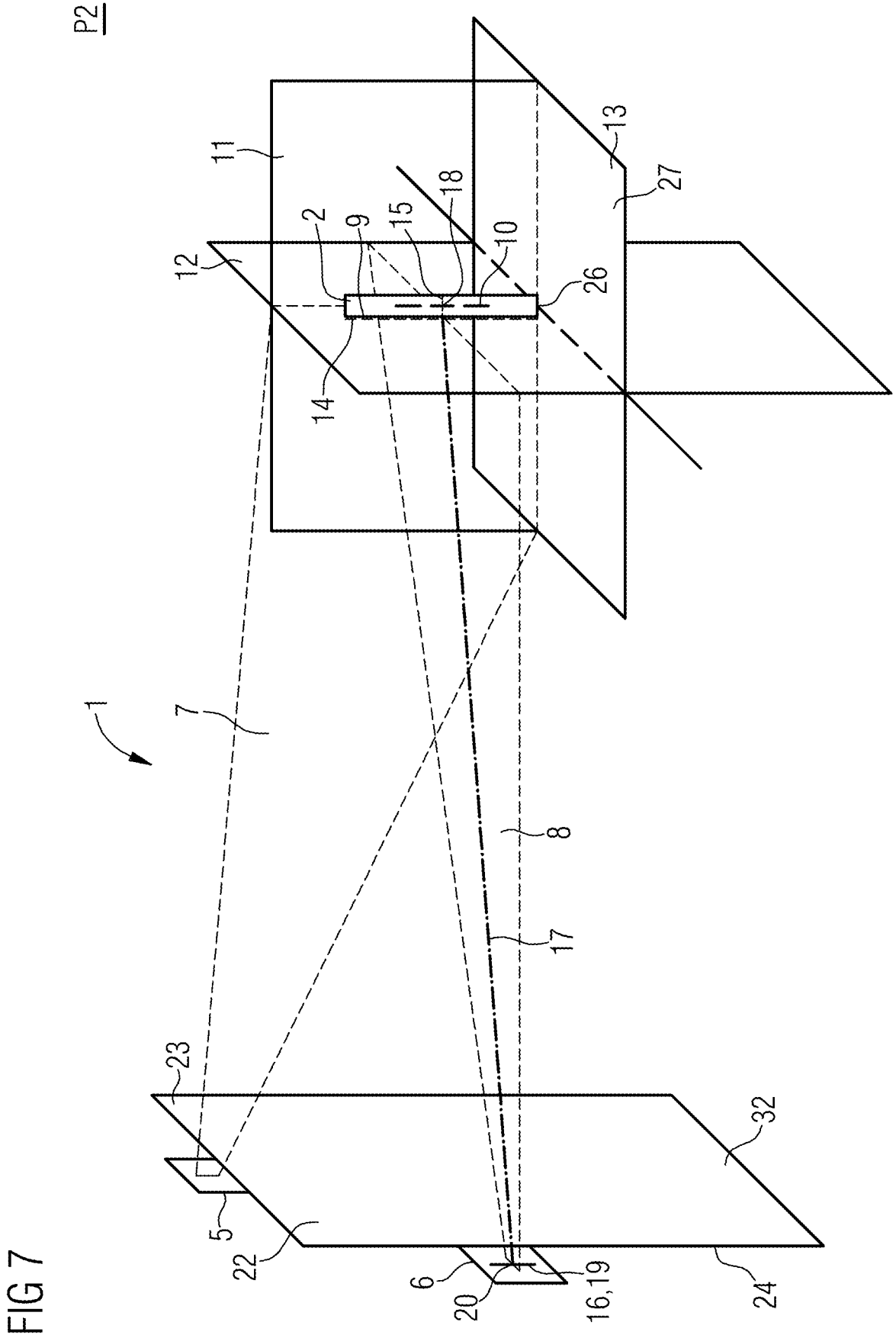
FIG. 7 is a schematic drawing of a laser-based alignment assistance apparatus according to the present embodiments in a second position with a medical needle.
Figure 8:
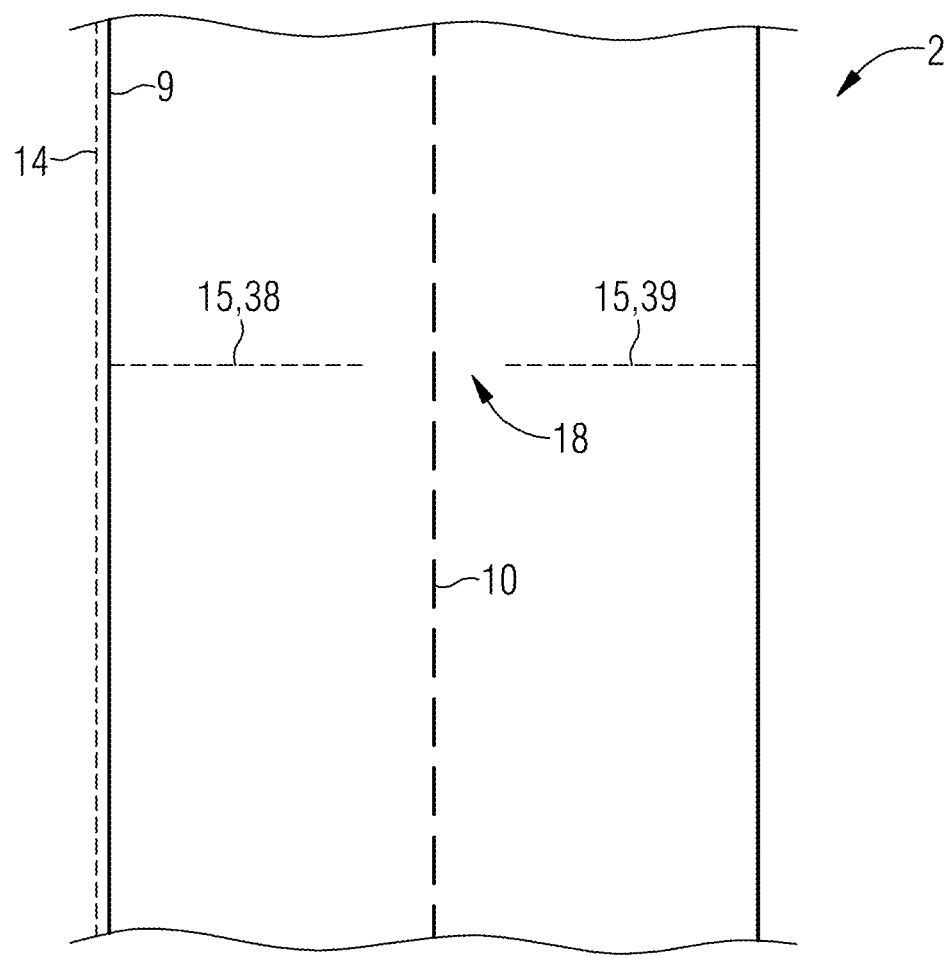
FIG. 8 is an enlarged schematic representation of the medical needle.

For the sake of completeness, FIG. 6, FIG. 7, and FIG. 8 also show the third sectional plane 13 of the instrument 2.

FIG. 7 shows a schematic drawing of the laser-based alignment assistance apparatus 1 according to the present embodiments in the second position P2 with a medical needle as an instrument 2. The instrument 2 is, for example, positioned at the puncture entry point 26 on the subject surface 27.

The first line laser 5 may be configured so that the first laser line 14 is produced on a first surface line 9 in a first sectional plane 11 of the instrument 2, if the first sectional plane 11 corresponds to the first laser plane 7.

The second line laser 6 may be configured to display a shadow point 18 of the shadow line 17 on a second surface line 10 of the instrument 2 in a second sectional plane 12 of the instrument 2, if the first sectional plane 11 and the second sectional plane 12 are correctly aligned according to the puncture trajectory.

FIG. 8 shows an enlarged schematic representation of the instrument 2 including a medical needle (e.g., a section of the medical needle). The user may visually perceive if the first laser line 9 appears on the first virtual surface line 9, where the first surface line 9 may correspond to a partial area of the needle cover. The second virtual surface line 10 may likewise correspond to a partial area of the needle cover, but offset relative to the first surface line 9. The second laser line 15 may also be displayed on the needle transverse to a longitudinal axis of the needle, where the shadow point 18 is located between a first partial line 38 and a second partial line 39 of the second laser line 15. For example, the instrument 2 is also aligned in the second sectional plane 12, if the instrument 2 is swiveled so that the shadow point 18 is displayed on the second surface line 10.

In the case of thin needles or large shadow points 18, it may be the case, however, that the second laser line 15 cannot be detected on an aligned instrument 2, especially if the shadow diameter of the shadow point 18 is greater than the diameter of the needle. For example, in this instance, the needle is aligned if the second laser line 15 is not visible on the needle.

Figure 9:
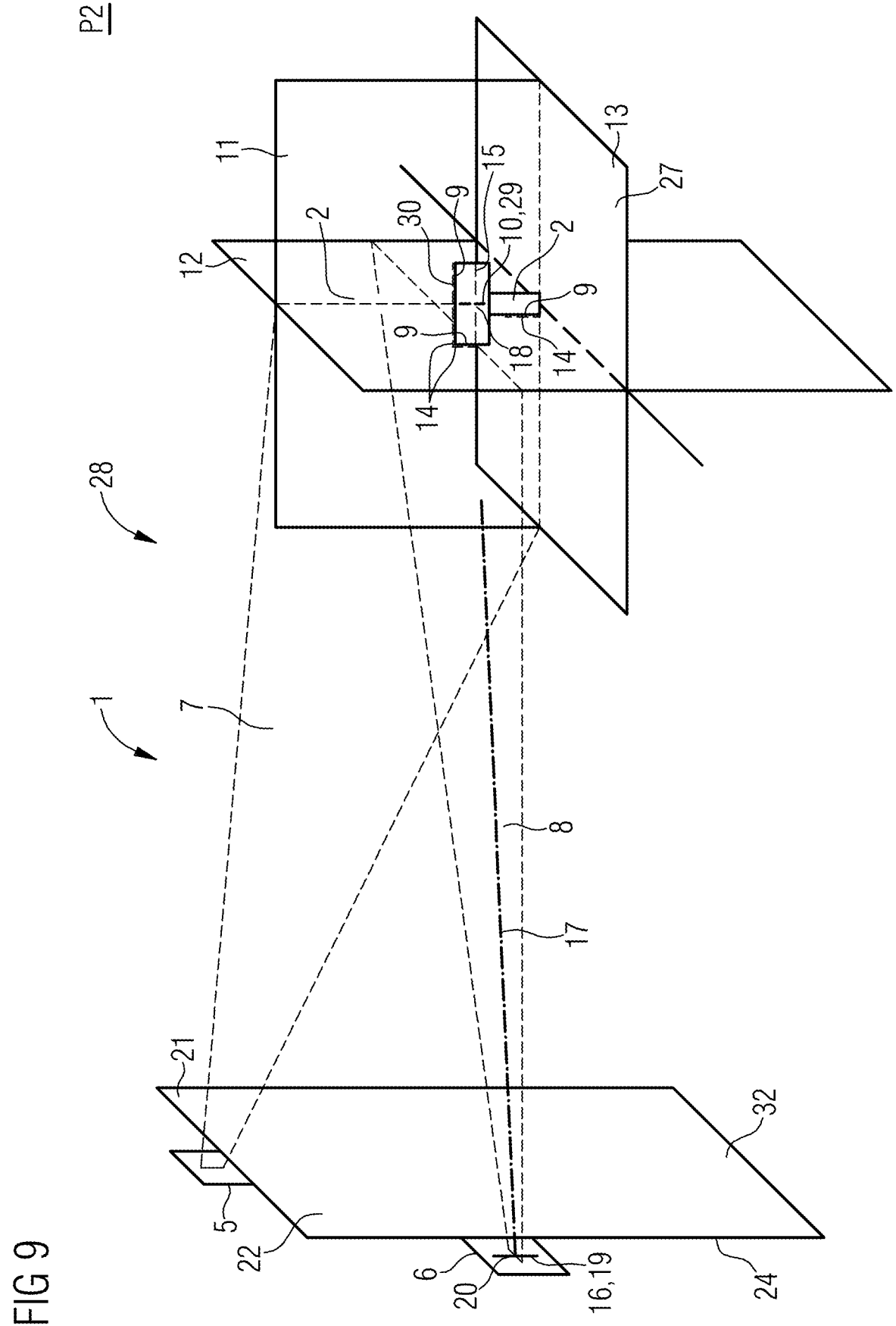
FIG. 9 is a schematic drawing of a laser-based alignment assistance system according to the present embodiments in a second position.

FIG. 9 shows a schematic drawing of a laser-based alignment assistance system 28 according to the present embodiments in the second position P2. For example, the instrument 2 of the system 28 has marking 29 along the second surface line 10, where the second sectional plane 12 is aligned if the shadow point 18 is displayed on the marking 29.

The instrument 2 may include a needle and a handle 30, where the handle 30 may have the marking 29. Depending on the thickness of the instrument 2 or the handle 30, the marking 29 may be slightly offset relative to the second surface line 10, in order to compensate for a shallow irradiation angle.

Figure 10:
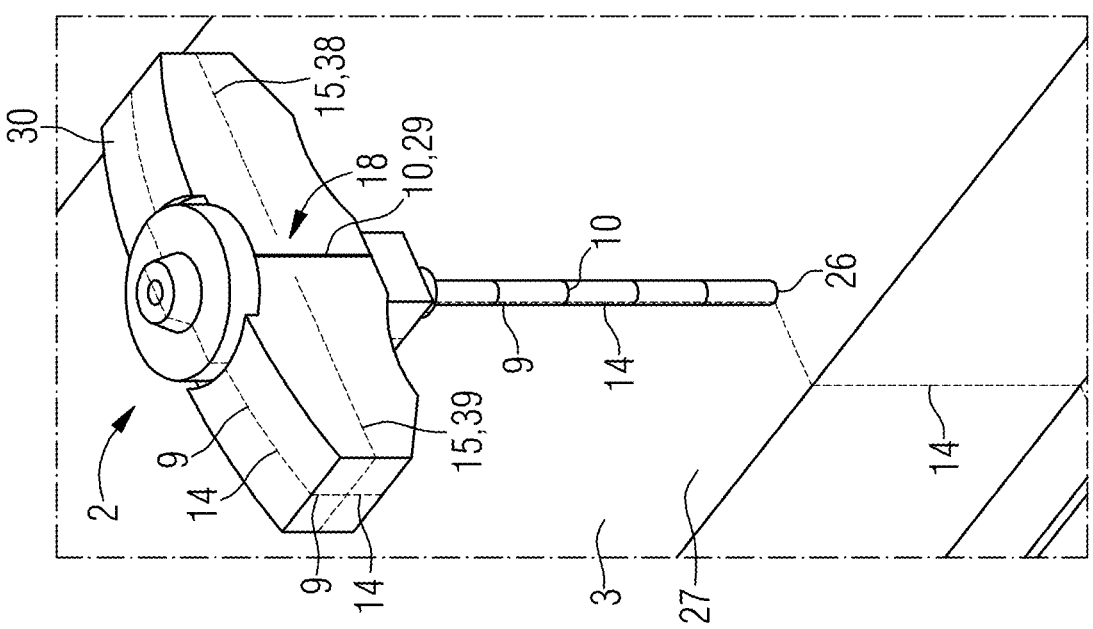
FIG. 10 is a first schematic representation of an instrument with marking.

FIG. 10 shows a first schematic representation of an example embodiment of an instrument 2 (e.g., with marking 29 on the second surface line 10). The instrument 2 has a handle 30 and a needle for the puncture. It is possible to detect on the instrument 2, which is aligned at the puncture entry point 26 and in the sectional planes 12, 13, that the first laser line runs along the first surface line 9 and also on the subject surface 27 of the subject 3. The first partial line 38 and the second partial line 39 of the second laser line 15 may also be seen, where the shadow point 18 is on the marking 29 between the partial lines 38, 39.

Figure 11:
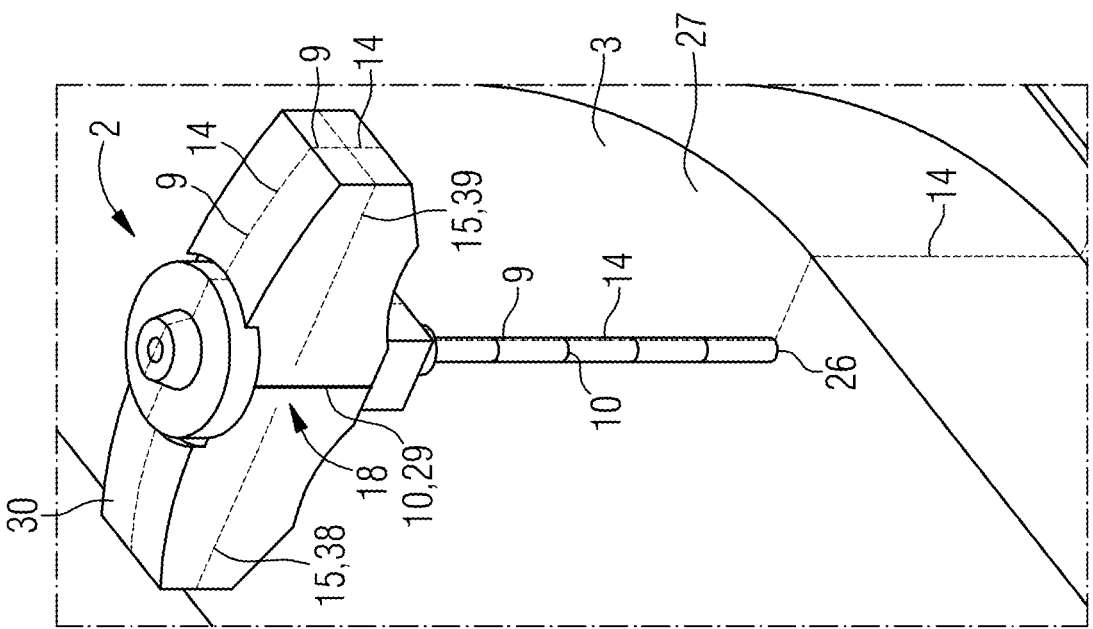
FIG. 11 is a second schematic representation of an instrument with marking.

FIG. 11 shows a second schematic representation of an example embodiment of an instrument 2 with marking 29 from a different perspective.

Figure 12:
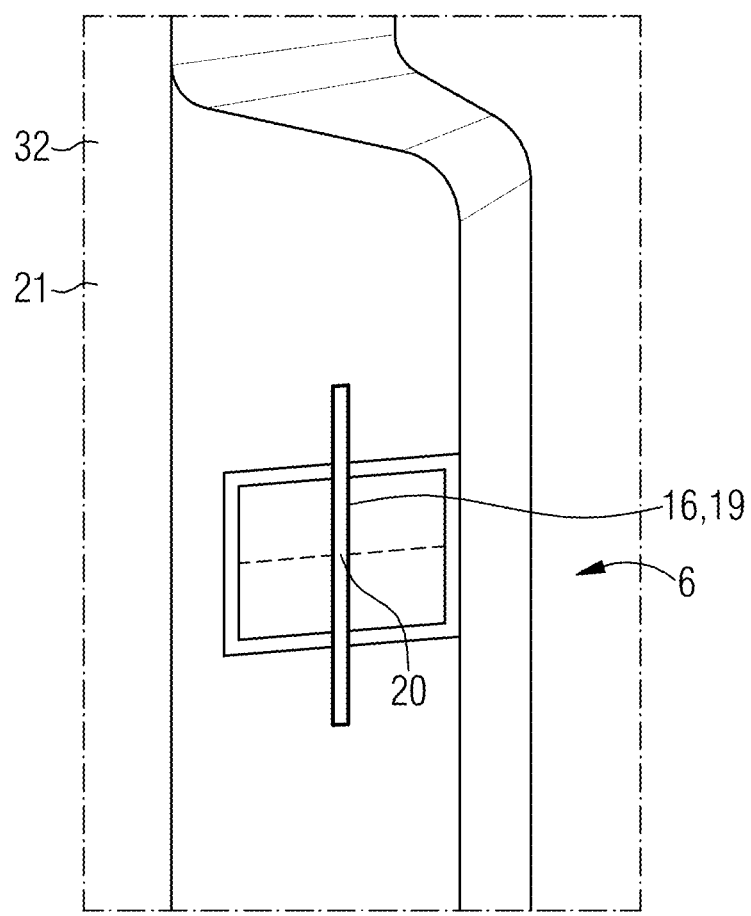
FIG. 12 is a schematic representation of a second line laser with a shielding element.

FIG. 12 shows a schematic representation of a second line laser 6 with a shielding element 16 embodied by a filament 19. In this example, the second line laser 6 is arranged on the same housing 21 as the X-ray detector 32. It is relatively simple to retrofit the line laser 6 with the shielding element 16 on such a housing 21.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A laser-based alignment assistance apparatus used to assist with alignment of an instrument for puncturing a subject, in particular for an X-ray imaging system, the laser-based alignment assistance apparatus comprising:
a first line laser to produce a first laser beam in a first laser plane, the first line laser being configured to produce a first laser line on a first surface line of the instrument in a first sectional plane of the instrument when the first sectional plane corresponds to the first laser plane; and
a second line laser to produce a second laser beam in a second laser plane intersecting the first laser plane;
a point-like shielding element of the second line laser to produce a shadow line in the second laser plane,
wherein the second line laser is configured to display a shadow point of the shadow line on a second surface line of the instrument in a second sectional plane of the instrument when the first sectional plane and the second sectional plane are aligned.

2. The laser-based alignment assistance apparatus of claim 1, wherein the shielding element is an adjustable shielding element.

3. The laser-based alignment assistance apparatus of claim 1, wherein the second line laser has an imaging optic that is configured to sharpen a contour of the shadow point.

4. The laser-based alignment assistance apparatus of claim 1, wherein the shielding element is a filament that intersects the second laser plane at a point.

5. The laser-based alignment assistance apparatus of claim 1, further comprising:
a housing on which the first line laser and the second line laser are arranged separately to each other.

6. The laser-based alignment assistance apparatus of claim 5, wherein the housing has a main extension area,
wherein the first line laser is positioned on a longitudinal side of the main extension area, and the second line laser is positioned on a transverse side of the main extension area.

7. The laser-based alignment assistance apparatus of claim 6, wherein the first line laser is configured to produce the first laser beam in the first laser plane, which essentially extends perpendicular to the main extension area, and the second line laser is configured to produce the second laser beam in the second laser plane, which essentially extends perpendicular to the main extension area and perpendicular to the first laser plane.

8. The laser-based alignment assistance apparatus of claim 5, further comprising:
a positioning device on which the housing is arranged,
wherein the positioning device is configured to move the housing with respect to the subject at least to a first position and to a second position,
wherein in the first position, the first line laser and the second line laser are configured such that the first laser line and a second laser line produced by the second line laser intersect at a puncture entry point on a subject surface of the subject, and
wherein in the second position the first line laser is configured to produce the first laser line on the first surface line on the instrument positioned at the puncture entry point when the first sectional plane corresponds to the first laser plane, and the second line laser is configured to display the shadow point on the second surface line of the instrument positioned at the puncture entry point when the first sectional plane and the second sectional plane are aligned.

9. A laser-based alignment assistance system used to assist with alignment of an instrument for puncturing a subject, the laser-based alignment assistance system comprising:
a laser-based alignment assistance apparatus used to assist with the alignment of the instrument for puncturing the subject, in particular for an X-ray imaging system, the laser-based aligment assistance apparatus comprising:
a first line laser to produce a first laser beam in a first laser plane, the first line laser being configured to produce a first laser line on a first surface line of the instrument in a first sectional plane of the instrument when the first sectional plane corresponds to the first laser plane; and
a second line laser to produce a second laser beam in a second laser plane intersecting the first laser plane; and
a point-like shielding element of the second line laser to produce a shadow line point of the shadow line on a second surface line of the instrument in a second sectional plane of the instrument when the first sectional plane and the second sectional plane are aligned; and
the instrument, which has marking along the second surface line,
wherein the second sectional plane is aligned when the shadow point is displayed on the marking.

10. The laser-based alignment assistance system of claim 9, wherein the instrument comprises a handle that has the marking.

11. The laser-based alignment assistance system of claim 9, wherein depending on a thickness of the instrument, the marking is arranged offset relative to the second surface line.

12. An X-ray imaging system comprising:
an X-ray source;
an X-ray detector; and
a laser-based alignment assistance apparatus used to assist with the alignment of the instrument for puncturing the subject, in particular for an X-ray imaging system, the laser-based aligment assistance apparatus comprising:
a first line laser to produce a first laser beam in a first laser plane, the first line laser being configured to produce a first laser line on a first surface line of the instrument in a first sectional plane of the instrument when the first sectional plane corresponds to the first laser plane;

a second line laser to produce a second laser beam in a second laser plane intersecting the first laser plane; and a point-like shielding element of the second line laser to produce a shadow line in the second laser plane, wherein the second line laser is configured to display a shadow point of the shadow line on a second surface line of the instrument in a second sectional plane of the instrument when the first sectional plane and the second sectional plane are aligned.

13. The X-ray imaging system of claim 12, wherein the first line laser and the second line laser are arranged on a housing of the X-ray detector or on a housing of the X-ray source.

14. The X-ray imaging system of claim 13, wherein the first line laser is conffigured to produce the first laser beam in the first laser plane, which essentially extends parallel to a projection direction of the X-ray imaging system, and wherein the second line laser is configured to produce the second laser beam in the second laser plane, which essentially extends parallel to the projection direction and perpendicular to the first laser plane.

15. The X-ray imaging system of claim 14, further comprising a rotating C-arm as a positioning device, on which the X-ray source and the X-ray detector are arranged, wherein the C-arm is configured to move the X-ray source and the X-ray detector with respect to the subject at least in a top view position and in a progress display position, wherein in the top view position, the first line laser and the second line laser are configured such that the first laser line and a second laser line produced by the second line laser intersect at a puncture entry point on a subject surface of the subject, and wherein in the progress display position, the first line laser is configured to produce the first laser line on the first surface line on the instrument positioned at the puncture entry point when the first sectional plane corresponds to the first laser plane, and the second line laser is configured to display the shadow point on the second surface line of the instrument positioned at the puncture entry point when the first sectional plane and the second sectional plane are aligned.

* * * * *